(12) United States Patent
Horne

(10) Patent No.: US 7,301,983 B1
(45) Date of Patent: Nov. 27, 2007

(54) METHOD FOR USING CODEBOOK INDEXING TO ACHIEVE HIGH BIT DENSITIES IN A DIRECT-SEQUENCE CDMA SPREAD SPECTRUM COMMUNICATION SYSTEM

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 981 days.

(21) Appl. No.: 09/002,747

(22) Filed: Jan. 5, 1998

(51) Int. Cl.
*H04K 1/00* (2006.01)

(52) U.S. Cl. .................. 375/130; 375/140; 375/146

(58) Field of Classification Search ............... 375/200, 375/206, 208, 130, 140, 141, 146; 364/717, 364/717.5; 370/335, 342, 441, 479
See application file for complete search history.

(56) References Cited

U.S. PATENT DOCUMENTS

| | | | | |
|---|---|---|---|---|
| 5,144,641 A | * | 9/1992 | Akazawa et al. | 375/200 |
| 5,173,923 A | * | 12/1992 | Crespo et al. | 374/200 |
| 5,210,770 A | * | 5/1993 | Rice | 375/142 |
| 5,295,153 A | * | 3/1994 | Gudmundson | 375/200 |
| 5,432,814 A | * | 7/1995 | Hasegawa | 377/202 |
| 5,559,829 A | * | 9/1996 | Le Strat et al. | 375/141 |
| 6,108,369 A | * | 8/2000 | Ovesjo et al. | 375/146 |
| 6,424,618 B1 | * | 7/2002 | Uesugi et al. | 370/208 |

OTHER PUBLICATIONS

"Coherent Ultrashort Light Pulse Code Division Multiple Access Communication Systems" Salehi et al. IEEE 1990 pp. 478-491, 1990.*
Written Opinion, PCT/US98/27591, Oct. 5, 1998, 4 pgs.

* cited by examiner

*Primary Examiner*—Temesghen Ghebretinsae
(74) *Attorney, Agent, or Firm*—Schwabe, Williamson & Wyatt, P.C.

(57) ABSTRACT

A method for achieving high bit densities in a direct-sequence CDMA spread spectrum communication system. A table of orthogonal pseudo-noise codes is stored. This table is then partitioned into multiple codebook. Then, the codebook is assigned to a user. The pseudo-noise code contained within the codebooks are used to spread information signal. Information signal for a first user is spread by a pseudo-noise code contained within the codebook assigned to the first user. Multiple bits of information signal may be sent at a time by using the location of the pseudo-noise code within the codebook such that the value of the information signal corresponds the location of the pseudo-noise code within the codebook. The information signal is then despread by using the same pseudo-noise code.

24 Claims, 4 Drawing Sheets

METHOD FOR USING CODEBOOK INDEXING TO ACHIEVE HIGH BIT DENSITIES IN A DIRECT-SEQUENCE CDMA SPREAD SPECTRUM COMMUNICATION SYSTEM

FIELD OF THE INVENTION

The present invention relates to the field of data communications. More particularly the invention describes a method of using codebook indexing to achieve high bit densities in direct sequence CDMA spread spectrum communication systems.

BACKGROUND OF THE INVENTION

Direct Sequence Spread Spectrum (DSSS) techniques rely on the use of pseudo-noise carriers, also called spreading codes, spreading sequences, code sequences and chip sequences, and a transmission bandwidth which is much wider than the minimum required to transmit the information. The transmitter spreads the information by modulating the information with a pseudo-noise spreading sequence. At the receiver, the information is despread to recover the base information. This despreading is accomplished by correlating the received, spread-modulated, signal with the spreading sequence used for the transmission. DSSS is sometimes referred to by the shorthand name "direct spread."

The modulating signal, such as a pseudo-random spreading code signal, possesses a chip rate (analogous to carrier frequency) which is much larger than the data rate of the information signal. This characteristic is required for efficient spreading. Each state of the pseudo-random spreading sequence is referred to as a chip. The spreading sequence (chip sequence) directly modulates each bit of the information signal, hence the name direct spread. Pseudo-randomness of the spreading signal is required in order to recover the original information signal. Since the spreading sequence is deterministic, it can be exactly duplicated at the receiver in order to extract the information signal. If it were truly random, extraction of the information signal via correlation receiver would not be possible.

The spreading operation causes the signal power to be depleted uniformly across the spread bandwidth. Thus, the spread spectrum signal will appear buried in noise to any receiver without the despreading signal. Consequently, it is not only difficult to jam, but is also difficult to detect its presence in any bandwidth. Any undesired signal picked up during transmission is spread by the receiver in the same way that the transmitter spread the desired signal originally. In other words, the receiver spreads undesired signals picked up during transmission, while simultaneously despreading, or demodulating, the desired information signal. Processing gain is the term used to express this interference suppression in the overall transmit/receive operation. When viewed as a transmit/receive operation, the desired signal is spread-modulated twice, giving back the original signal, while in-band interference is spread-modulated once, and thereby depleted across the full spread bandwidth.

CDMA Direct Spread is an adaptation of conventional Direct Spread which accommodates multiple simultaneous access through the use of mutually orthogonal spreading codes. Mutually orthogonal means the cross correlation of any spreading code in the set is small (ideally zero). In an ideally orthogonal system, orthogonality not only means that there is no mixing of signals, but it also means that there is no interference between signals. In practice, the number of multiple access users cannot increase without bound because each user signal contributes a small multiple access interference component due to deviations from ideal. Since the receiver detection margin is not infinite, an eventual limit is reached.

SUMMARY OF THE INVENTION

A method for achieving high bit densities in a direct-sequence CDMA spread spectrum communication system. A table of orthogonal pseudo-noise codes is stored. This table is then partitioned into multiple codebooks. Then, each codebook is assigned to a user. The pseudo-noise codes contained within the codebooks are used to spread information signal. Information signal for a first user is spread by a pseudo-noise code contained within the codebook assigned to the first user. Multiple bits of information signal may be sent at a time by using the location of the pseudo-noise code within the codebook such that the value of the information signal corresponds the location of the pseudo-noise code within the codebook. The information signal is then despread by using the same pseudo-noise code.

BRIEF DESCRIPTION OF THE DRAWINGS

The present invention is illustrated by way of example and not limitation in the figures of the accompanying drawings, in which like references indicate similar elements and in which:

FIG. 1(*b*) is a diagram showing a spread signal with interference being demodulated into the original signal and noise.

FIG. 2(*b*) is an exemplary method of spreading signals using codebook indexing.

DETAILED DESCRIPTION OF THE INVENTION

The disclosed technique utilizes a previously unexploited grouping of orthogonal spreading codes into fixed codebooks for each user signal. By direct-spreading with a data dependent spreading code, where this spreading code is an indexed-member of a fixed-size codebook, the information capacity of the transmitted signal is increased over conventional direct sequence spread spectrum techniques. This information capacity increase is achieved with virtually no change in transmit power or bandwidth. Implementation is relatively simple and does not alter the orthogonality properties at the receive since all codebook entries with a codebook, and among multiple codebooks, are derived from an orthogonal set. Codebook size can be traded off for implementation resources, number of multiple access channels desired, and data rate differences between the multiple access channels.

By grouping a large orthogonal spreading code set into smaller codebooks, with each user signal assigned a unique codebook, multiple bits can be conveyed within each symbol period for each user signal. This grouping, together with the data-dependent index into the codebook results in conveying an additional 'n' bits per symbol, where 'n' is the log-base-2 of the codebook size. Additionally, since each codebook is a distinct subset of the full orthogonal code set, multiple access capability is possible. Multiple user signals are each spread by a distinct set of orthogonal codes from the codebook assigned to a given user signal.

Figure 1A:
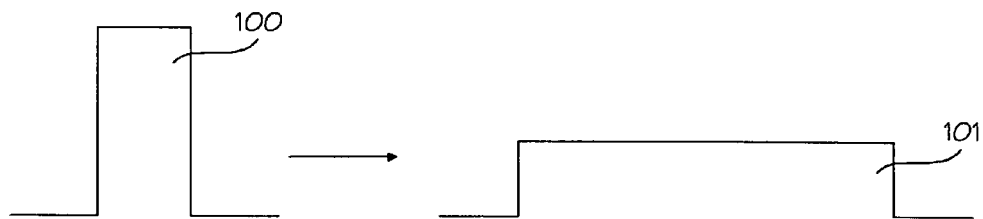
FIG. 1(*a*) is a diagram showing a signal being spread.
Figure 1B:
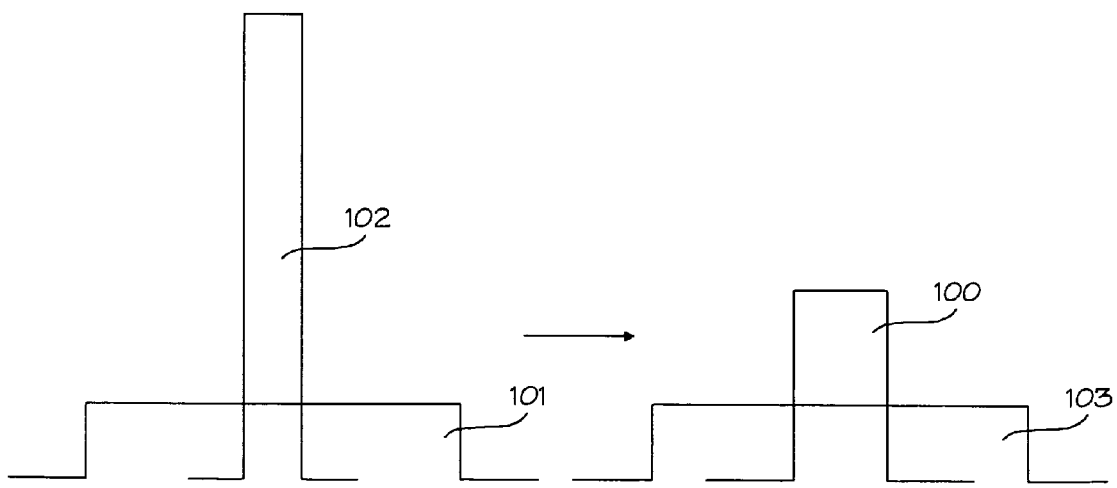

FIG. 1(a) shows an example of what occurs to a signal when it is spread. Signal 100 is spread using a spreading sequence (not shown) into signal 101. As can be seen, the amplitude of the signal is decreased, while its bandwidth is expanded. By reducing the amplitude, the signal will appear indistinguishable from noise, and can only be recovered by a receiver which processes the correct spreading sequence. FIG. 1(b) shows the spread signal 101 and an interference signal 102 which has been picked up during transmission. When the spread modulated signal 101 is demodulated by using the original spreading sequence (not shown), the original signal 100 is recovered and the interference signal 102 is spread into signal 103, thereby being reduced to noise.

Figure 2A:
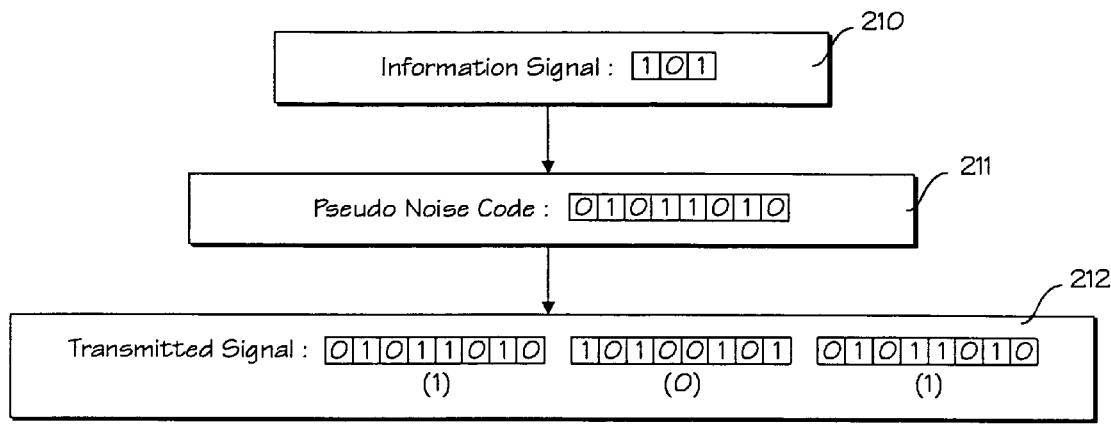
FIG. 2(*a*) is an exemplary prior art method of spreading signals.

FIG. 2(a) is a diagram of an exemplary prior art method of spreading a signal. An information signal 210 is modulated, using known methods, by a pseudo-noise code 211. For each '1' in the information signal, the pseudo-noise code 211 is transmitted. Whereas for each '0' in the information signal, the inverse of the pseudo-noise code 211 is transmitted. Thus, through such modulation, the signal is spread out for transmission into the transmitted signal 212. For example, if the information signal 210 consists of the bits '101' and the pseudo-noise code 211 is '01011010' then the transmitted signal 212 is '01011010 10100101 01101101.' This transmitted signal is created by '1' corresponding to the pseudo-noise code 211 ('010110101') and '0' corresponding to the inverse of the pseudo-noise code ('10100101').

Figure 2B:
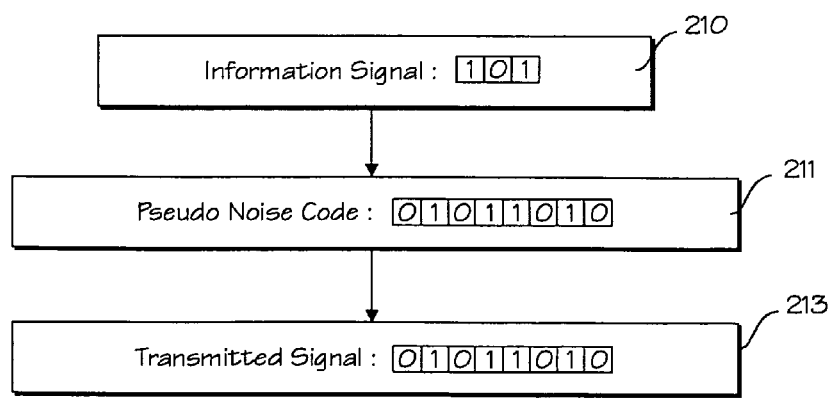

FIG. 2(b) is a diagram of an exemplary method of spreading a signal using codebook indexing. As described above, the information signal 210 is again modulated by a spreading signal to create a transmitted signal 213. However, in this case, instead of using a pseudo-noise code, codebook indexing is used. By using codebook indexing, multiple bits of information can be transmitted per pseudo-noise code instead of a single bit, as described above. In codebook indexing, the position of the pseudo-noise code is used to encode multiple bits of information within the pseudo-noise code sent. Therefore, if two bits of information are to be sent per pseudo-noise code, a codebook with four entries is required because two bits of information have four possible values, where the value ranges from zero to three. If the value of the information bits is 3 (the bits are '11'), then the fourth pseudo noise code, the one is position '11', contained within the codebook is used. In FIG. 2(b), the same information signal 210 ('101') of FIG. 2(a) is used. In this case, since a binary '101' equals a numeric 5, the sixth pseudo-noise code contained within the codebook, the one is position '101' is used. Assuming that this pseudo-noise code 211 '01011010,' then the transmitted signal is the pseudo-noise code of '01011010.'

Figure 3:
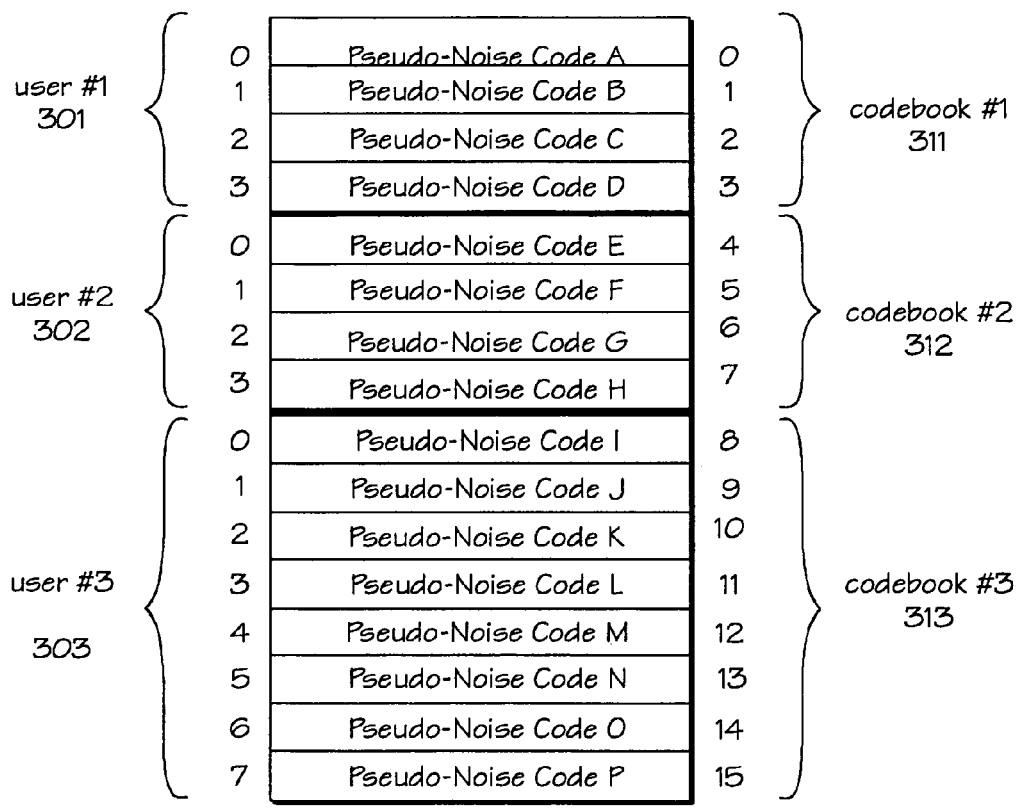
FIG. 3 is diagram of a pseudo-noise code table partitioned into multiple codebooks.

FIG. 3 is a diagram of an exemplary pseudo-noise table 300 where the table is broken into multiple codebooks. This table has 16 rows, row 0-15. User #1 (301) is assigned the first codebook 311. This codebook 311 contains the pseudo-noise codes contained within table positions 0-3, which are pseudo-noise codes A, B, C and D. User #2 (302) is assigned the second codebook 312. Codebook #2 (312) contains the pseudo-noise codes contained within table positions 4-7, which are pseudo-noise codes E, F, G and H. Finally, User #3 (303) is assigned the third codebook 313. Codebook #3 (313) contains pseudo-noise codes contained within table positions 8-15, which are pseudo noise codes I-P. In this example, codebook #1 (311) and codebook #2 (312) each contained four rows, thus, user #1 (301) and user #2 (302) are each assigned four rows. However, codebook #3 (313) contains eight rows, thus, user #3 (303) is assigned eight rows. As shown here, the number of rows contained within each codebook does not have to be equal, however, the number of rows contained within each codebook needs to be a power of 2 (i.e. 2, 4, 8, 16, 32, 64, etc.). Codebook #1 (311) contains four rows, therefore two bits of data may be sent per each pseudo-noise code. This is the case because to describe four rows, two bits are needed. Since codebook #3 (313) contains eight rows, which requires three bits to describe all eight rows, three bits of data may be sent per each pseudo-noise code contained within codebook #3 (313).

Figure 4:
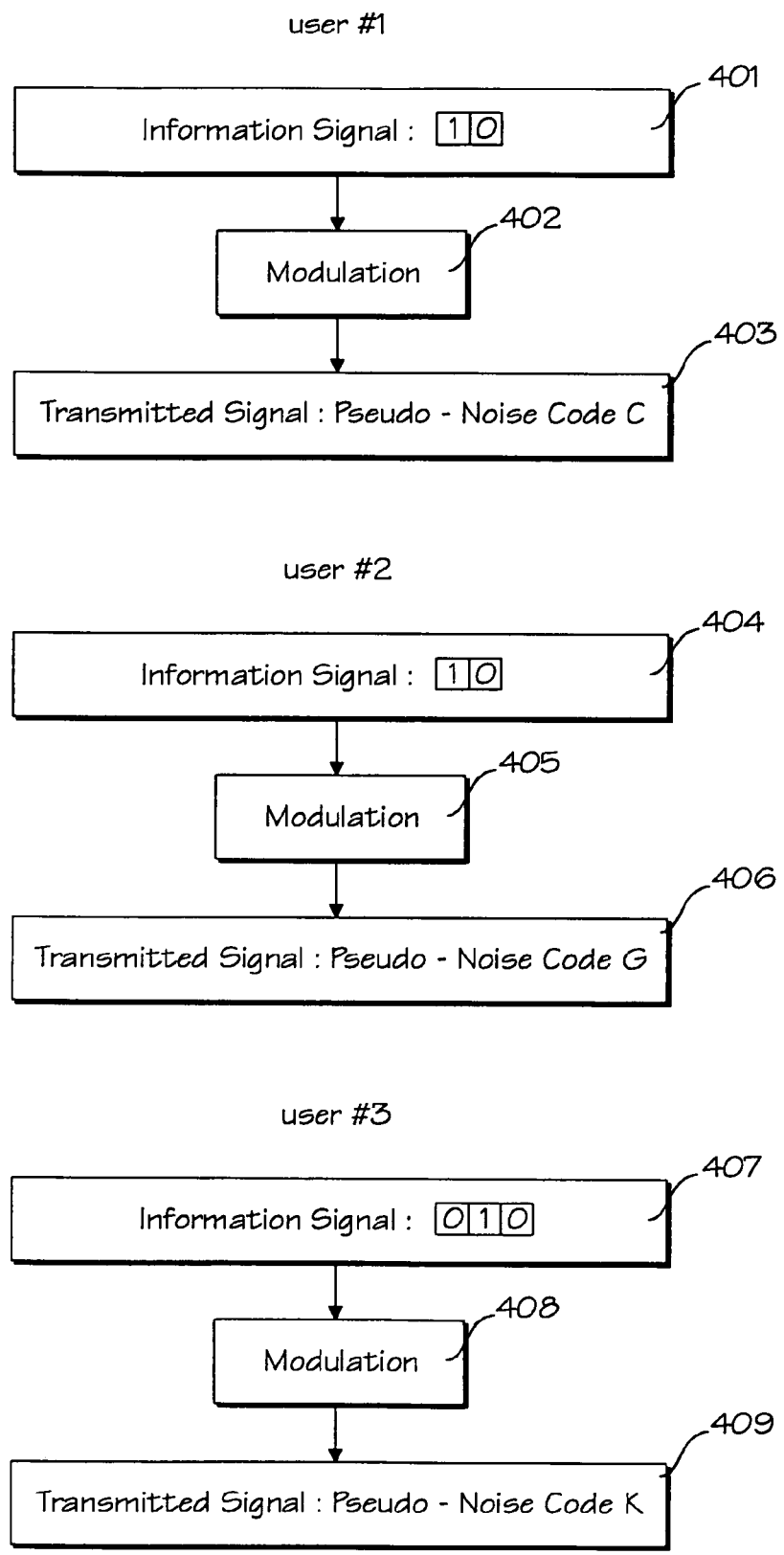
FIG. 4 is a diagram showing a method of spreading signals for three users using the codebook indexing of the table of FIG. 3.

FIG. 4 shows an example of how to use the codebooks of the table of FIG. 3 to send multiple bits of data per each pseudo-noise code. If the information signal 401 is '10' and is for the first user, the pseudo-noise code contained within the first codebook at position '2' (or '10') within that codebook is used. This corresponds to pseudo-noise code C, therefore, the transmitted signal 403 is pseudo-noise code C. Similarly, if the information signal 404 is '10' and is for the second user, the pseudo-noise code contained within the second codebook at position '2' within the codebook is used. This corresponds to pseudo-noise code G, therefore, the transmitted signal 406 is pseudo-noise code G. Finally, in the case of signals for the third user, three bits of information can be sent per pseudo-noise code. Therefore, if the information signal 407 for user #3 is '010' the pseudo-noise code contained within the third codebook at position '2' is used. This corresponds to pseudo-noise code K, therefore, the transmitted signal 409 is pseudo-noise code K.

What is claimed is:

1. A method comprising:
partitioning a table of spreading codes into at least two codebooks each having at least two spreading codes;
assigning a first codebook of the at least two codebooks to a first user; and
spreading a first information signal for the first user with a first spreading code contained within the first codebook, wherein a location of the first spreading code within the first codebook corresponds to a value of the first information signal for the first user.

2. The method of claim 1 further comprising:
spreading a second information signal for the first user with a second spreading code contained within the first codebook, wherein the second spreading code contained within the first codebook corresponds to a value of the second information signal for the first user.

3. The method of claim 2 wherein a location of the second spreading code within the first codebook corresponds to the value of the second information signal for the first user.

4. The method of claim 1 further comprising:
assigning a second codebook of the at least two codebooks to a second user; and
spreading a first information signal for the second user with a first spreading code contained within the second codebook.

5. The method of claim 4 further comprising:
spreading a second information signal for the second user with a second spreading code contained within the second codebook.

6. The method of claim 5 wherein a location of the second spreading code within the second codebook corresponds to a value of the second information signal for the second user.

7. The method of claim 1 further comprising:
despreading the first information signal for the first user with the first spreading code within the first codebook.

8. The method of claim 1 wherein the partitioning the table of the spreading codes further comprises:
partitioning the table into codebooks such that there are $2^n$ entries, where n is a whole number.

9. The method of claim 1 wherein a single spreading code transmits multiple bits of information signal.

10. A method comprising:
storing a table of orthogonal pseudo-noise codes;
partitioning the table of orthogonal pseudo-noise codes into at least one codebook having a plurality of pseudo-noise codes;
assigning a first codebook to a first user; and
spreading a first information signal for the first user with a first pseudo-noise code contained within the first codebook, wherein a location of the first pseudo-noise code within the first codebook corresponds to a value of the first information signal for the first user.

11. The method of claim 10 further comprising:
spreading a second information signal for the first user with a second pseudo-noise code contained within the first codebook.

12. The method of claim 11 wherein a location of the second pseudo-noise code within the first codebook corresponds to the value of the second information signal for the first user based at least in part on a location of the second pseudo-noise code within the first codebook.

13. The method of claim 10 further comprising:
assigning a second codebook to a second user; and
spreading a first information signal for the second user with a first pseudo-noise code contained within the second codebook.

14. The method of claim 13 further comprising:
spreading a second information signal for the second user with a second pseudo-noise code contained within the second codebook.

15. The method of claim 13 wherein a location of the second pseudo-noise code within the second codebook corresponds to a value of the second information signal for the second user.

16. The method of claim 10 further comprising:
despreading the first information signal for the first user with the first pseudo-noise code within the first codebook.

17. The method of claim 10 wherein the partitioning the table of the orthogonal pseudo-noise codes further comprises:
partitioning the table into codebooks such that there are $2^n$ entries, where n is a whole number.

18. The method of claim 1, wherein the number of spreading codes in the first codebook and in a second codebook of the at least two codebooks is different.

19. The method of claim 18, wherein the first codebook has at least four spreading codes and the second codebook has at least eight spreading codes.

20. The method of claim 1, wherein the spreading codes are orthogonal codes.

21. The method of claim 1, wherein the spreading codes are pseudo-noise codes.

22. The method of claim 1, further comprising storing the table of spreading codes.

23. The method of claim 1, wherein the first information signal has a plurality of bits.

24. The method of claim 10, wherein the first information signal has a plurality of bits.

* * * * *

UNITED STATES PATENT AND TRADEMARK OFFICE
CERTIFICATE OF CORRECTION

| | | |
|---|---|---|
| PATENT NO. | : 7,301,983 B1 | Page 1 of 1 |
| APPLICATION NO. | : 09/002747 | |
| DATED | : November 27, 2007 | |
| INVENTOR(S) | : David M. Horne | |

It is certified that error appears in the above-identified patent and that said Letters Patent is hereby corrected as shown below:

Column 5
Lines 28-29, "...first user based at least in part on a location of the second pseudo-noise code within the first codebook." should read --...first user.--.

Signed and Sealed this

Twenty-fourth Day of March, 2009

JOHN DOLL
*Acting Director of the United States Patent and Trademark Office*